United States Patent [19]
Derezinski et al.

[11] Patent Number: 5,500,172
[45] Date of Patent: Mar. 19, 1996

[54] METHOD FOR PLASTICIZING PARTICULATE PLASTIC MATERIAL

[75] Inventors: Stephen J. Derezinski, Penfield; Stephen T. Faulkenberry, Conesus, both of N.Y.

[73] Assignee: Eastman Kodak Company, Rochester, N.Y.

[21] Appl. No.: 259,430

[22] Filed: Jun. 14, 1994

Related U.S. Application Data

[62] Division of Ser. No. 942,253, Sep. 9, 1992, Pat. No. 5,358,327.

[51] Int. Cl.⁶ .............................. B29B 7/46; B29C 47/80
[52] U.S. Cl. ............... 264/68; 264/211.21; 264/211.23; 264/310; 264/349; 264/331.21
[58] Field of Search .................... 264/211.21, 211.23, 264/349, 312, 310, 68, 331.21; 425/205, 206, 207, 203, 144, 208–209, 381, 382.3

[56] References Cited

U.S. PATENT DOCUMENTS

| | | | |
|---|---|---|---|
| 2,431,274 | 11/1947 | Osborne | 264/211.21 |
| 2,894,280 | 7/1959 | Juve | 264/349 |
| 3,070,836 | 1/1963 | Dehaven et al. | 264/40.7 |
| 3,342,901 | 9/1967 | Kosinsky et al. | 264/349 |
| 3,535,737 | 10/1970 | Hendry | 425/203 |
| 3,563,514 | 2/1971 | Shattuck | 366/75 |
| 3,664,789 | 5/1972 | Gibney | 425/381 |
| 3,711,067 | 1/1973 | Kovacs | 425/209 |
| 3,787,160 | 1/1974 | Leister | 425/208 |
| 4,118,163 | 10/1978 | Lee | 425/208 |
| 4,249,877 | 2/1981 | Machen | 425/204 |
| 4,671,761 | 6/1987 | Adrian et al. | 425/206 |

FOREIGN PATENT DOCUMENTS

| | | | |
|---|---|---|---|
| 2261854 | 10/1975 | France | 425/205 |
| 2029875 | 1/1971 | Germany | 264/211.23 |
| 3441320 | 6/1985 | Germany | 425/205 |
| 0835799 | 6/1981 | U.S.S.R. | 264/349 |
| 1303643 | 1/1973 | United Kingdom | 264/68 |

*Primary Examiner*—Jeffery R. Thurlow
*Attorney, Agent, or Firm*—Susan L. Parulski

[57] ABSTRACT

A plasticizing method uses an apparatus (10) including a barrel (12) having a bore (14) therethrough. An auger (24) and a rotor (30) are positioned in the bore, each extending from opposed ends (16, 18) of the barrel (12) and having ends (26, 34) that are substantially flush. The auger (24) conveys particulate plastic material along the bore (14), the plastic being frictionally melted before passing the auger discharge end (26). The rotor (30) is provided to uniformly heat the melted plastic. Auger (24) and rotor (30) each are associated with independent means for rotating (28, 32) and means for controlling the speed of rotation (50, 52). The speed of rotation of the auger (24) controls the flow rate of plastic through the bore, and the speed of rotation of the rotor (30) controls the temperature of the melted plastic.

6 Claims, 3 Drawing Sheets

METHOD FOR PLASTICIZING PARTICULATE PLASTIC MATERIAL

This is a divisional of U.S. application Ser. No. 942,253, filed 09 Sep. 1992, now U.S. Pat. No. 5,358,327.

FIELD OF INVENTION

The invention relates to apparatus for melting and heating particulate plastic material. The invention also relates to a method for melting and heating particulate plastic material.

BACKGROUND OF THE INVENTION

Polymers such as plastics are often processed into forms or finished goods by means of an extruder, such as a screw extruder. The flow rate of extruded material or extrudate is established during continuous feed operation by setting the speed of the screw for the desired product flow rate. The temperature of the extrudate is also an important parameter, as it can affect material properties of the formed product, for example strength and percentage of defects in the product, to name but a few. Accordingly, it is important to control not just the product flow rate but also the extrudate temperature and temperature distribution.

U.S. Pat. No. 4,249,877 describes an extruder that employs a feed screw connected to an annular heated section. External band heaters provide the heat to the heated section to heat the extrudate. A disadvantage with this device is non-uniform heating of theoextrudate.

U.S. Pat. No. 3,563,514 describes a plasticizer that employs two rotors having opposed cone-shaped tips which define a working zone therebetween. A disadvantage is that, despite the presence of a small annular region in the barrel positioned between the working zone and the product no post-working zone heating zone capable of uniformly heating the extrudate is provided.

U.S. Pat. No. 3,070,836 describes an extruder having independent drive means to drive separate screws within a single barrel. Problems with this extruder are that the material flow rate is affected by both drive means and that means for uniformly heating the extrudate is not provided.

An object of this invention is to provide apparatus for forming a heated, melted extrudate having a uniform temperature distribution to thereby produce a plastic having consistent material properties and few defects.

SUMMARY OF THE INVENTION

Briefly summarized, according to one aspect of the present invention, there is provided an apparatus for plasticizing particulate plastic material, the apparatus comprising:

a housing, the housing having a bore therethrough, and the bore having an inlet end and an outlet end;

means for feeding particulate plastic material into the bore at the inlet end;

an auger positioned in the bore, the auger having an inlet end to receive material from the means for feeding and a discharge end at an intermediate location in the bore;

means for rotating the auger to convey the particulate plastic material from the means for feeding along the bore and to frictionally melt the particulate plastic material before the particulate material passes the discharge end;

means for controlling the speed of rotation of the auger to control the flow rate of plastic through the outlet end;

a smooth-walled, cylindrical rotor positioned in the bore between the auger and the outlet end, the bore and the rotor defining an annulus therebetween, the rotor having a first end positioned proximate to the discharge end of the auger the rotor having an axial length and the annulus extending from the first end along the length of the rotor;

means for rotating the rotor to uniformly heat the melted particulate plastic material passing from the discharge end of the auger and through the annulus independent of the flow rate of melted plastic through the annulus; and means for controlling the speed of rotation of the rotor for obtaining a desired temperature of melted plastic particulate material at the outlet end of the housing.

In another aspect of the invention, there is provided a method of plasticizing particulate plastic material, comprising the steps of:

providing a plasticizer, the plasticizer comprising:

a housing, the housing having a bore therethrough, and the bore having an inlet end and an outlet end;

an auger positioned in the bore, the auger having a discharge end at an intermediate location in the bore; and a smooth-walled, cylindrical rotor positioned in the bore between the auger and the outlet end, the bore and the rotor defining an annulus therebetween, and the rotor having a first end positioned proximate to the discharge end of the auger, the rotor having an axial length and the annulus extending from the first end along the length of the rotor;

feeding the plastic particulate material into the bore at the inlet end;

rotating the auger at a desired speed and thereby conveying the particulate plastic material at a desired flow rate through the outlet end and frictionally melting the particulate plastic material before passing the discharge end to form a melt; and rotating the rotor at a desired speed to uniformly heat the melted particulate plastic material passing from the discharge end of the auger and through the annulus to a desired temperature independent of the flow rate of the melted plastic through the annulus.

An advantage of the invention over the prior art is that it provides accurate temperature control independent of flow rate over a wide range of plastic flow rates and for a wide variety of polymers. High flow rate with low temperature, low flow rate with high temperature, or variations therebetween can be achieved by the method and apparatus of the invention. The invention therefore provides the capability to process very high viscosity materials, such as those having a viscosity greater than 10,000 poise, as well as lower viscosity materials.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
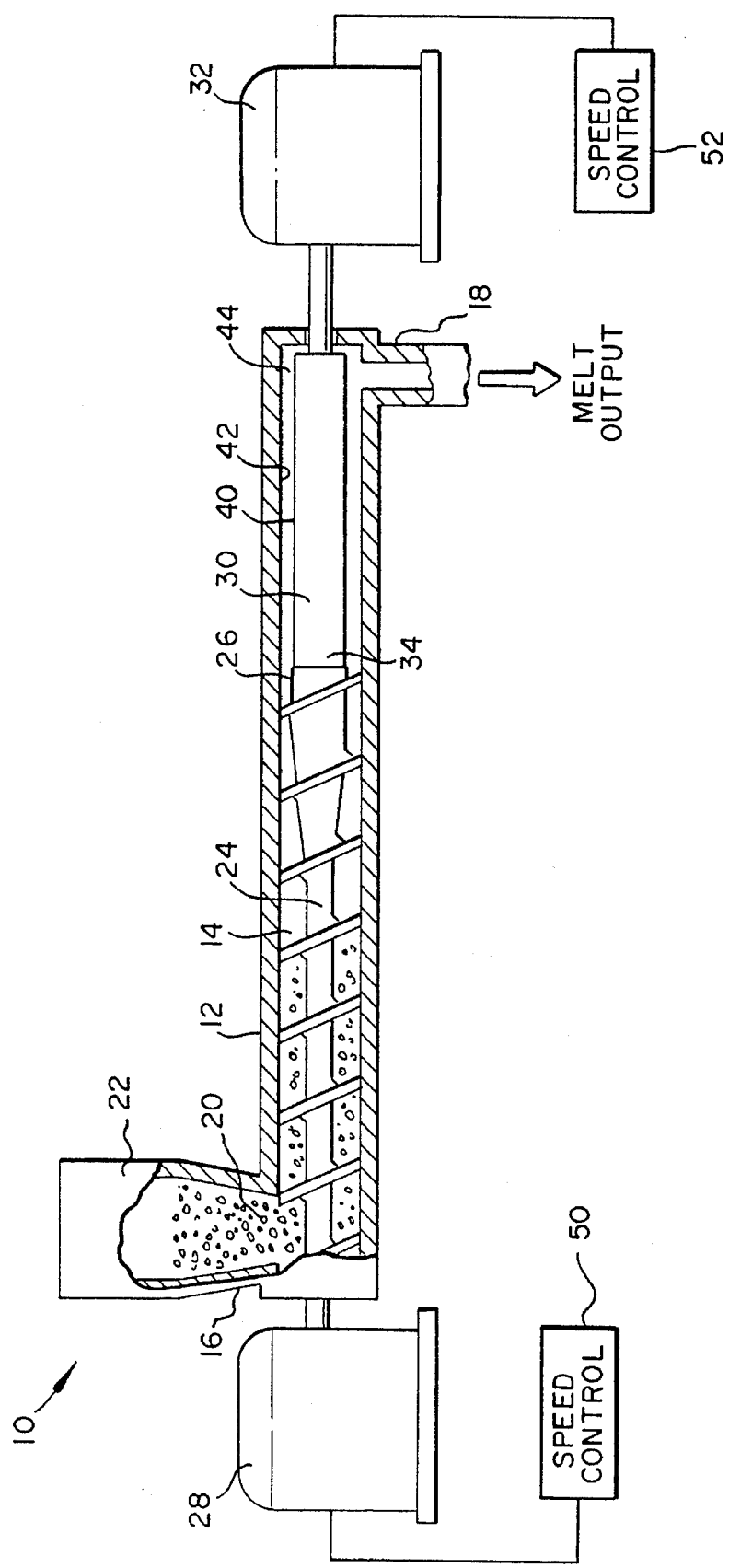
FIG. 1 is a longitudinal, cross-sectional view of the apparatus according to the invention.

Referring to FIG. 1, plasticizer 10 comprises barrel 12 having bore 14 therein extending from inlet end 16 to outlet end 18, inlet end 16 having inlet 20 extending therethrough to bore 14. Means for feeding particulate plastic into bore 14 is feed hopper 22 positioned at inlet 20. Alternatively, means for feeding can comprise manual feeding, or other means such as conveying means as is well known in the art. Auger 24 is snugly positioned in bore 14 to convey and frictionally melt particulate plastic material for discharge from discharge end 26 of auger 24. Motor 28 is means for rotating auger 24. Rotor 30 is positioned in bore 14, and motor 32 is means for rotating rotor 30.

Figure 2:
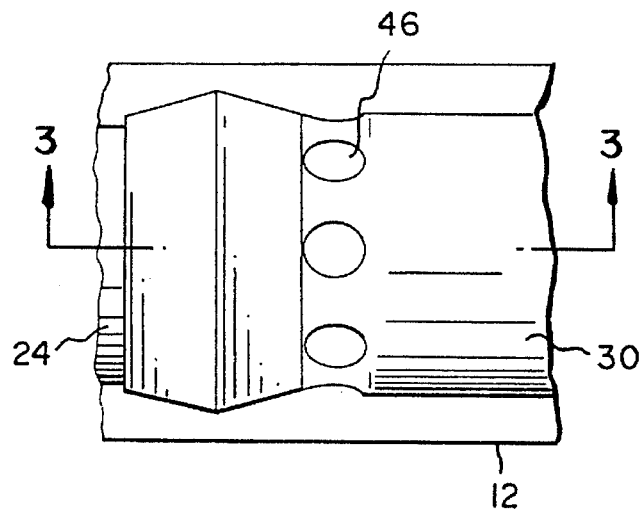
FIG. 2 is an enlarged, fragmentary, top plan view showing details at the juncture of the auger and the rotor according to the invention.
Figure 3:
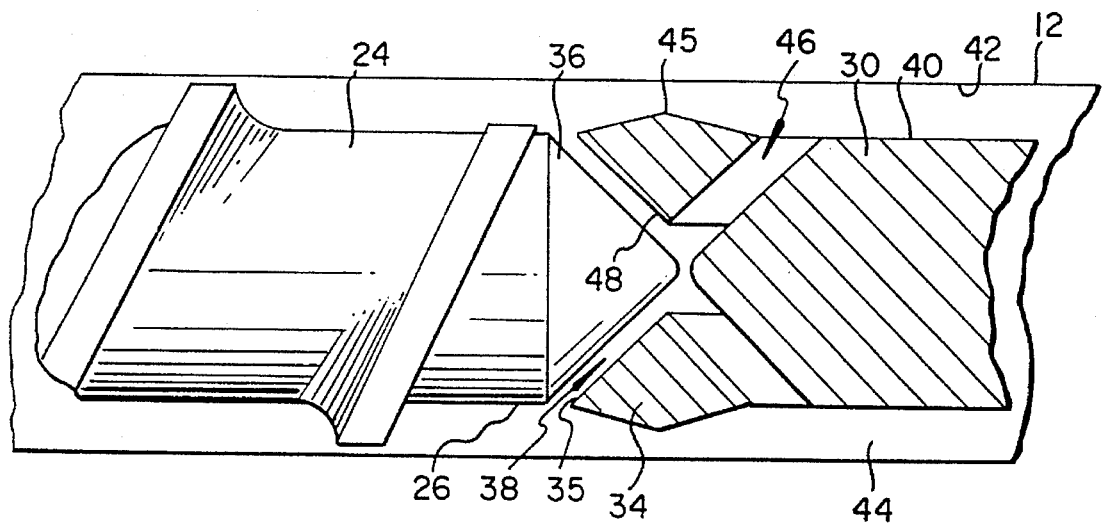
FIG. 3 is a view taken along section 3—3 of FIG. 2.

As shown in FIGS. 2 and 3, auger 24 and rotor 30 are not connected, and as such are independently driven by motors 28 and 32, respectively. Auger 24 and rotor 30 can therefore be operated at independent speeds and can rotate in the same or opposite direction. Rotor 30 has first end 34 having an axially extended, centrally located hollow 35 therein. Auger 24 at end 26 has an axially extended, centrally located and essentially conical tip 36 positioned proximate to end 34 and as shown being positioned inside hollow 35. Other means of positioning tip 36 proximate to end 34 and permitting independent rotation of auger 24 and rotor 30 are well known in the art and can be used in the practice of the invention, for example a rotating seal, sealed bearing, or the like. As shown, tip 36 is conical in shape, although it can assume any convenient shape, the selection of which can depend on the choice of rotating seal or bearing or the like. Tip 36 and hollow 35 are configured so as to define annular flow passage 38 between the facing surfaces of tip 36 and end 34 of rotor 30. Rotor 30 has smooth-walled, cylindrical outer surface 40 spaced from inner wall 42 of barrel 12 to define annulus 44 therebetween. Rotor 30 has at least one port 46 extending obliquely from wall 40 to bearing surface 48 of hollow 35 in rotor 30. Port 46 thus extends from annulus 44 to passage 38, allowing a portion of the melt to flow through passage 38 and then to annulus 44 via port 46. In this manner, the melt functions as a lubricant between facing surfaces of tip 36 and first rotor end 34 during operation of the plasticizer. The size and the number of such ports 46 are influenced by factors such as the material being plasticized, melt flow rheology, and rotor material and strength. A preferred number of such ports is eight or more.

It may be desirable to provide for increased flow through passage 38 depending on the viscosity of the melt, the need for additional lubricant flow into passage 38, or other such factors. In a preferred embodiment, surface 40 at end 34 is outwardly beveled to form a circumferentially extended raised wall portion 45, decreasing the cross-sectional melt flow area in annulus 44 and thereby forcing a greater portion of the melt into passage 38. Melt from passage 38 flows to annulus 44 via port 46 at a location downstream of wall portion 45.

During rotation of auger 24, tip 36 functions as a journal and supports rotor 30 by bearing surface 48, the diverted portion of plastic melt functioning as the bearing lubricant. Passage 38 should be sufficiently wide to allow for thermal expansion and still maintain sufficient clearance between tip 36 and bearing surface 48. Generally, a width of passage 38 that is at least about ½ the width of annulus 44 ("h", in the Equations below) allows sufficiently for thermal expansion while providing sufficient flow of melt into passage 38 and clearance between tip 36 and bearing surface 48.

The rate of rotation of auger 24 determines the feed rate of plastic material through bore 14, as at higher RPM's the feed rate increases. A preferred flow rate of plastic is in the range of from about 100 lb/hr (45.4 kg/hr) to about 500 lb/hr (227.3 kg/hr). Auger 24 can be rotated at speeds in excess of auger speeds used in other auger applications, as further described in the Example below, because auger speed in the invention affects only the plastic flow rate. Augers used in other, conventional applications tend to generate excessive temperatures at speeds useful in the invention. A preferred auger speed is in the range of from about 30 rpm to about 150 rpm.

The rate of rotation of rotor 30 controls the heating rate and thus the temperature of the melted plastic in annulus 44. The temperature of the melted plastic increases as the rotational speed of rotor 30 increases. Rotor 30 can be operated at high speeds, such as those described in the Example below, to provide a broad range of melt temperature in the practice of the invention. Rotor 30 can also be run at oscillating speeds if so desired. A preferred melt temperature using poly(ethylene) terephthalate ("PET") as the plastic in the invention is in the range of from about 530° F. (264° C.) to about 540° F. (269° C.). A preferred rotor speed is in the range of from about 50 rpm to about 500 rpm. The temperature of the melt discharged at outlet end 18, or at points downstream therefrom, can be monitored by conventional means and the speed of rotor 30 adjusted as necessary to provide a desired temperature. Alternatively, melt temperature upstream of outlet end 18 can be monitored and adjusted as desired. Other parameters such as viscosity can be monitored, either in addition to or as an alternative to temperature monitoring, to control the melt output rheology.

Motors 28 and 32 are each preferably a variable or adjustable speed motor employing electrical, rather than mechanical, speed changing and speed control means. Each motor can be operated at any convenient speed, depending on the desired flow rate of plastic and the desired temperature of the plastic as discussed above. Means for independently controlling the speed of motor 28 and motor 32 to thereby independently control the speed of rotation of auger 24 and rotor 30 comprise speed controls 50 and 52, respectively. Speed controls 50 and 52 can be any convenient such design as is well known in the art. One skilled in the art can readily select a compatible combination of motor and speed control in the practice of the invention.

Auger 24 is shown with a basic screw flight design, having a single lead, constant pitch, constant diameter, and constant depth. Other embodiments within the scope of the invention include an auger having a multiple lead, variable pitch, changing diameter, and/or changing flight depth.

In the plasticizing operation of the invention, raw particulate plastic material in pellet, flake, or granular form is provided to feed hopper 22 and fed through inlet 20 into bore 14. Motor 28 rotates auger 24 at a selected speed to convey the plastic material and frictionally melt the plastic before the particulate material passes discharge end 26. After the melted plastic passes discharge end 26, it enters annulus 44 between rotor surface 30 and barrel surface 42. Additional plastic conveyed by auger 24 forces the melted plastic passing discharge end 26 through annulus 44. As described above, a portion of the melt is diverted through passage 38 and ports 46 and flowed to annulus 44 downstream of wall portion 45. Motor 32 rotates rotor 30 at a selected speed to produce viscous shear heating of the plastic as the plastic is forced through annulus 44 toward barrel discharge end 18. The viscous shear produced by rotating rotor 30 is substantially axially linear, resulting in uniform heating of the melted plastic and thereby minimizing hot spots that can degrade and gel the plastic.

The plasticizer capacity is primarily determined by the horsepower and speed of the motors rather than by the size of the barrel. The plasticizer of the invention can therefore have a barrel size smaller than a conventional extruder, resulting in a less expensive design having a lower residence time. The rotor is a less expensive component than the second screws or augers used in conventional extruder designs. The lack of flights of the rotor eliminates places where plastic flow can stagnate and results in improved, shorter residence times.

The relationship between melt temperature and rotor length is governed by the following equations:

$$N_T = \ln(1 + N_s^2 \phi) \quad \text{(Eq. 1)}$$

$$N_P = N_T/(N_s^2 \phi) \quad \text{(Eq. 2)}$$

where dimensionless parameters are defined as $$N_T = \delta T/B \quad \text{(Temp Number)} \quad \text{(Eq. 3)}$$

$$N_p = \pi D \rho h^3 (\delta P)/12 m L \mu_0 \quad \text{(pressure number)} \quad \text{(Eq. 4)}$$

$$N_S = N[(\pi D)^3 \mu_0/BC_p m]^{1/2} \quad \text{(speed number)} \quad \text{(Eq. 5)}$$

$$\phi = L/h \quad \text{(length number)} \quad \text{(Eq. 6)}$$

where melt viscosity is a function of temperature given by $$\mu(z) = \mu_0 e^{-(T(z) - T(0))/B}$$

and the terms are defined as
z=axial flow direction
$\delta T$=temperature increase of the melt=T(L)−T(0)
B=constant, °F.
D=diameter of barrel
$\rho$=melt density
$\delta P$=pressure of rotor
m=flow of auger
L=length of rotor
$\mu_0$=viscosity at T(0)
N=rotor speed
Cp=melt specific heat
h=gap between rotor and barrel (annulus)
T(0)=melt temperature entering rotor (z=0)
T(L)=melt temperature leaving rotor (z=L)
Rotor length can be calculated as follows:
For a desired temperature increase $\delta T$, calculate $N_T$ from Eq. 3. Solve Eq. 1 assuming a rotor speed N to determine $N_S$. Solve Eqs. 1 and 5 simultaneously to determine $\phi$. Solve Eq. 2 for Np. Select a value for pressure that is much less than auger pressure and solve Eq. 4 to determine h. Using the value for h solve Eq. 6 for L. By means of these solutions, N, L, and h can be determined such that N is within the operating capability of a selected motor drive, L is equal or less than the auger length, and h is large enough to not be greatly affected by machine tolerances.

The auger length should be such that for a given rotor speed it will (1) provide the desired melt temperature and (2) not require excessive pressure for the auger flow. The auger should produce sufficient pressure for the rotor and any equipment downstream of the rotor, such as an extrusion die, piping, mixer, filter, and the like. Therefore, rotor pressure should be minimal, such as below about 100 psi. The desired melt temperature and output pressure can therefore be achieved by an appropriate selection of rotor speed, annular gap, and rotor length as described herein. A preferred ratio of auger length to rotor length is in the range of from about 2:1 to about 1:1. In a preferred embodiment, the ratio of the total barrel length to barrel diameter is in the range of from about 20:1 to about 30:1.

Although the invention does not require means for heating barrel 26, it can be provided for heating of the plastic material during initial startup of the device and process. An induction heater (not illustrated) can, for example, be provided on the outside surface of barrel 14 for this purpose.

The melt output of the plasticizer of the invention can be provided to a conventional extrusion die that receives the heated, melted plastic discharged from the plasticizer annulus and forms an extruded plastic form.

The invention is further illustrated by the following example of its practice.

EXAMPLE

Figure 4:
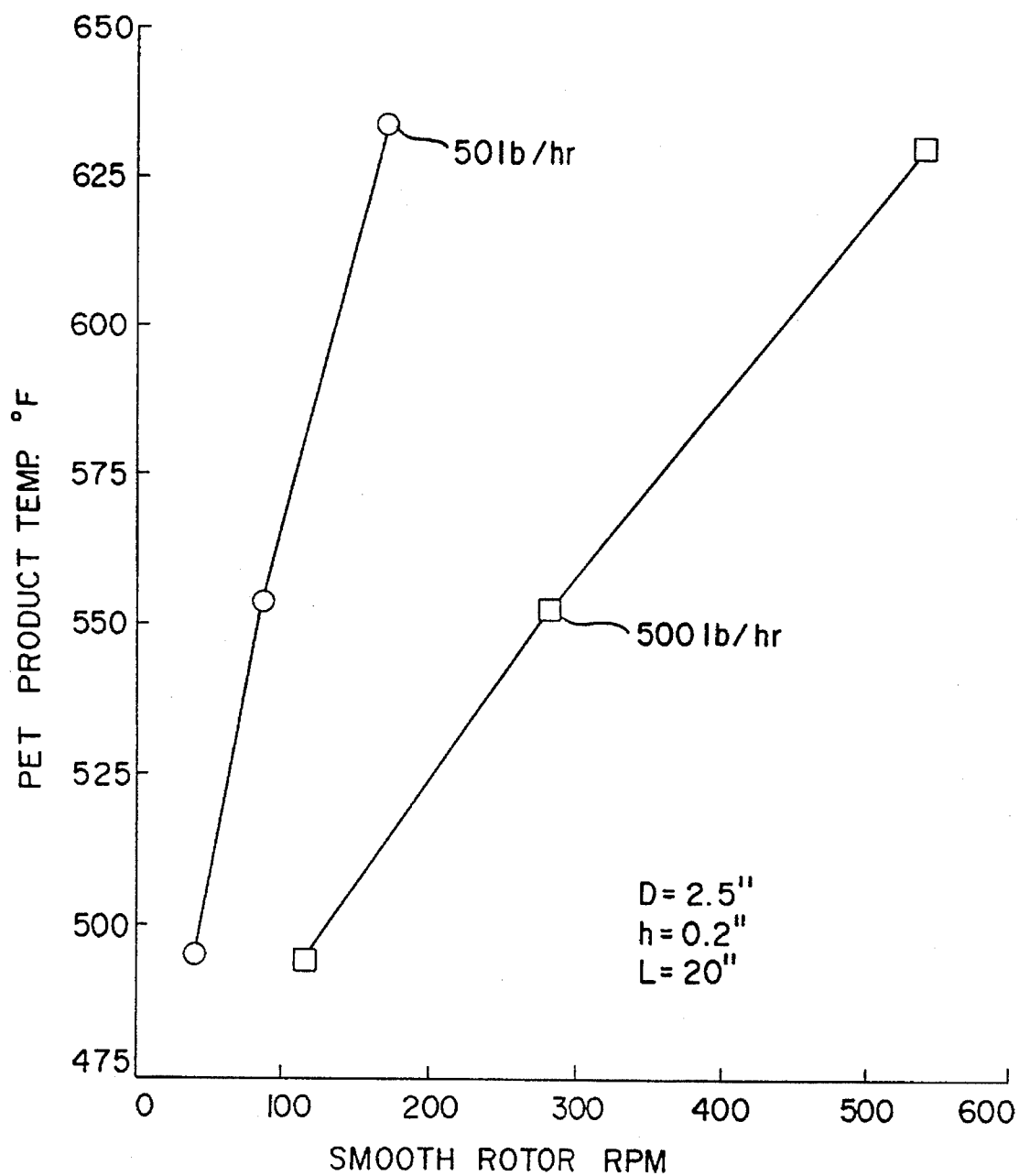
FIG. 4 is a graph of extrudate temperature versus rotor speed in one aspect of the invention employing poly(ethylene) terephthalate as the particulate plastic and extrudate.

FIG. 4 shows the design curves for the rotor of a 2.5 inch diameter plasticizer according to the invention. Output temperature was calculated for two flow rates, 50 lb/hr (22.7 kg/hr) and 500 lb/hr (227.3 kg/hr). Poly(ethylene) terephthalate ("PET") is the plastic particulate material provided to the plasticizer. The initial temperature is the melting point of PET, 475° F. (246° C.). As FIG. 4 shows, a usable range of temperatures is easily obtained at each flow rate within feasible rotor speeds.

The results show that the melt temperature changes decisively with rotor speed to provide positive, stable control of the product temperature. The melt temperature desired can depend on the type of plastic used, the intended use of the melted plastic, ambient temperature, and other factors. The length of the plasticizer is 50 inches, or 20 times the diameter, which compares to conventional plasticizing extruders that have a length that is about 30 times the diameter and cannot process more than about 200 lb/hr of plastic (90.92 kg/hr).

The invention has been described in detail with particular reference to preferred embodiments thereof, but it will be understood that variations and modifications can be affected within the spirit and scope of the invention.

We claim:

1. A method of plasticizing particulate plastic material, comprising the steps of:
   providing a plasticizer, the plasticizer comprising:
      a housing, the housing having a bore therethrough, and the bore having an inlet end and an outlet end;
      an auger positioned in the bore, the auger having a discharge end at an intermediate location in the bore; and
      a smooth-walled, cylindrical rotor positioned in the bore between the auger and the outlet end, the bore and the rotor defining an annulus therebetween, and the rotor having a first end positioned proximate to the discharge end of the auger, the rotor having an axial length and the annulus extending from the first end along the length of the rotor;
   feeding the plastic particulate material into the bore at the inlet end;
   rotating the auger at a desired speed and thereby conveying the particulate plastic material at a desired flow rate through the outlet end and frictionally melting the particulate plastic material before passing the discharge end to form a melt; and
   rotating the rotor at a desired speed to uniformly heat the melted particulate plastic material passing from the discharge end of the auger and through the annulus to a desired temperature independent of the flow rate of the melted plastic through the annulus.

2. The method of claim 1 wherein the first end of the rotor has a hollow therein;

the discharge end of the auger has a tip that is positioned in the hollow of the rotor, the tip and the hollow being configured so as to define a flow passage therebetween for receiving melted plastic to lubricate facing surfaces of the tip and the first rotor end during operation of the plasticizer; and the rotor has at least one port extending from a downstream wall portion therethrough to the flow passage for returning the melted plastic from the flow passage to the annulus.

3. The method of claim 1, wherein the auger is rotated at a speed in the range of from about 30 rpm to about 150 rpm.

4. The method of claim 1, wherein the rotor is rotated at a speed in the range of about 50 rpm to about 500 rpm.

5. The method of claim 1, wherein the flow rate of plastic through the plasticizer is in the range of from about 100 lb/hr (45.4 kg/hr) to about 500 lb/hr (227.3 kg/hr).

6. The method of claim 1, wherein the plastic comprises poly(ethylene) terephthalate and the temperature of the melt discharged from the plasticizer is in the range of from about 530° F. (264° C.) to about 540° F. (269° C.).

* * * * *